(12) United States Patent
Bushelman et al.

(10) Patent No.: US 7,960,014 B2
(45) Date of Patent: Jun. 14, 2011

(54) MULTILAYER POLYMER STRUCTURE

(75) Inventors: Corinne Bushelman, Cumming, GA (US); James K. Doty, Alpharetta, GA (US); Jean De Canniere, Brussels (BE); Johan Billiet, Ghent (BE)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 614 days.

(21) Appl. No.: 11/720,128

(22) PCT Filed: Nov. 23, 2005

(86) PCT No.: PCT/EP2005/056181
§ 371 (c)(1),
(2), (4) Date: May 24, 2007

(87) PCT Pub. No.: WO2006/056581
PCT Pub. Date: Jun. 1, 2006

(65) Prior Publication Data
US 2008/0118756 A1 May 22, 2008

Related U.S. Application Data

(60) Provisional application No. 60/630,204, filed on Nov. 24, 2004.

(30) Foreign Application Priority Data

Aug. 25, 2005 (EP) .................... 05107816

(51) Int. Cl.
*B29C 47/06* (2006.01)
*B32B 7/02* (2006.01)
*B32B 27/08* (2006.01)
*B32B 27/30* (2006.01)
*B32B 27/34* (2006.01)

(52) U.S. Cl. .................. 428/212; 428/421; 428/474.4; 156/244.11

(58) Field of Classification Search .................. None
See application file for complete search history.

(56) References Cited

U.S. PATENT DOCUMENTS

| 3,624,250 | A | * | 11/1971 | Carlson ............ 526/247 |
| 5,387,645 | A | * | 2/1995 | Montag et al. ......... 525/66 |
| 5,576,106 | A | * | 11/1996 | Kerbow et al. ......... 428/403 |
| 5,763,034 | A | | 6/1998 | Nishino et al. |
| 2003/0099799 | A1 | | 5/2003 | Koike et al. |
| 2006/0270798 | A1 | * | 11/2006 | Touraud et al. ......... 525/178 |
| 2006/0280888 | A1 | | 12/2006 | Bersted |

FOREIGN PATENT DOCUMENTS

| EP | 0 650 987 | 5/1995 |
| EP | 1 347 465 | 9/2003 |
| EP | 1 557 445 | 7/2005 |
| JP | 05-245988 | 9/1993 |
| WO | WO 96/03448 | 2/1996 |
| WO | WO 98/05493 | 2/1998 |
| WO | WO 01/65161 | 9/2001 |
| WO | WO 01/81077 | 11/2001 |
| WO | WO 2005/018891 | 3/2005 |

OTHER PUBLICATIONS

MatWeb database overview entry for PFA, Apr. 2010.*
Dupont Tefzel HT-2202 Production Information, Aug. 2002, XP002358004.
U.S. Appl. No. 11/720,044, filed May 23, 2007, Bushelman, et al.
U.S. Appl. No. 10/568,612, filed Feb. 16, 2006, Bushelman, et al.
U.S. Appl. No. 12/849,039, filed Aug. 3, 2010, Bersted, et al.
U.S. Appl. No. 12/849,038, filed Aug. 3, 2010, Bushelman, et al.

* cited by examiner

*Primary Examiner* — Ramsey Zacharia
(74) *Attorney, Agent, or Firm* — Oblon, Spivak, McClelland, Maier & Neustadt, L.L.P.

(57) ABSTRACT

Multilayer Polymer Structure Multilayer structure comprising at least one couple (L1-L2) of adjacent layers (L1) and (L2), wherein layer (L1) comprises at least one polymer composition (C1) comprising a grafted fluoropolymer material (M1) consisting of N1 grafted fluoropolymer(s) (P1), said polymer(s) (P1) obtained by a process comprising grafting onto an ungrafted fluoropolymer (U1) at least one grafting agent (G1) chosen from ethylenically unsaturated carboxy acids, their esters, their anhydrides and their salts, layer (L2) comprises at least one polymer composition (C2) comprising at least one impact modifier (I2) and a semi-crystalline aromatic polyamide material (M2) consisting of N2 semi-crystalline aromatic polyamide polymer(s) (P2), and the average melting temperature ($T_{av,1}$) of material (M1) differs by at most 45° C. from the average melting temperature ($T_{av,2}$) of material (M2), $N_j$ being the number of polymer(s) (Pj) of material (Mj), $Nj>1$, $T_{av,j}$ being equal to formula (T) $w_{i,j}$ being the weight amount of the $i^{th}$ polymer (Pj) of material (Mj), $T_{i,j}$ being the melting temperature of the $i^{th}$ polymer (Pj) of material (Mj), $W_j$ being the total weight amount of material (Mj), for j=1 and for j=2. Process for manufacturing the above multilayer structure, which comprises co-extruding polymer compositions (C1) and (C2), so as to obtain couple (L1-L2) of adjacent layers (T1) and (T2). Shaped article comprising the above multilayer structure, and process for manufacturing it.

$$\left(\sum_{i=1}^{N_j} w_{i,j} T_{i,j}\right) / W_j \quad (1)$$

28 Claims, 3 Drawing Sheets

US 7,960,014 B2

MULTILAYER POLYMER STRUCTURE

REFERENCE TO RELATED APPLICATIONS

This application is a 371 of PCT/EP05/56181 filed Nov. 23, 2005. This application claims priority to U.S. provisional application 60/630,204, filed Nov. 24, 2004, and European application 05107816.0, filed Aug. 25, 2005, the contents of both applications being incorporated herein by reference.

The present invention relates to an improved multilayer polymer structure. It also relates to a process for manufacturing said multilayer polymer structure, to a shaped article comprising said multilayer polymer structure and to a process for manufacturing said shaped article.

It is known that multilayer polymer structures having a rather good combination of properties may be obtained from fluoropolymers and aliphatic polyamides like nylon 12 and nylon 6,6. Usually, in such nylon-based fluorinated multilayer structures, the innermost layer is made of fluoropolymer and provides resistance towards aggressive chemical environments, whereas the outermost layer is made of aliphatic polyamide and provides rather high thermal stability, rather high barrier resistance and a rather high level of mechanical properties, notably a rather high strength and a rather high dimensional stability.

However, for certain demanding applications, there is a need for new multilayer polymer structures with an improved balance of properties when compared to the prior art structures as previously described. Notably, there is a need for new multilayer polymer structures with improved chemical resistance, improved thermal stability, improved impermeability towards a wide range of different chemical compounds, improved dimensional stability, improved abrasion resistance and improved constancy of overall performance on aging.

Moreover, it would be desirable that such improved multilayer structures be obtainable by a more attractive process than prior art processes comprising coating, extrusion coating, and/or adhesive lamination. Said process should be more attractive in that it would be especially well suited for the manufacture of shaped articles as diversified and/or complex as multilayered films in flat form and in tubing form (e.g. automotive fuel lines or hoses; vapor lines; heat exchanger tubings), and multilayered hollow bodies, especially those having complex cross-sectional configurations like fuel tanks for the automotive industry.

While it is true that some multilayer polymer structures have already been prepared by co-extrusion processes, these ones proved in general to be very delicate, in that their success was shown to depend on numerous parameters the effect of which appeared merely to be difficulty predictable by the skilled person, including the design of the die, the way how the individually extruded melts are brought together, and the selection of the polymers forming the various layer of the co-extruded multilayer structure. To this point, it was observed that inadequate co-extrusion parameters resulted in various problems, including delamination problems and loss of chemical and structural integrity of the multilayer structure.

More particularly, it was observed by the skilled in the art that, when one layer of a two-layer structure was made of a fluoropolymer (notably an aliphatic fluoropolymer), the other one being made of an engineered thermoplastic such as an aliphatic polyamide, co-extrusion was, for some obscure reasons, still more delicate, and problems notably of weak interlayer adhesion, unstable operating conditions, poor dimensional stability and sagging were often met.

The present invention aims at meeting most of, if not all, the above described needs and overcoming most of, if not all, the above described problems.

SUMMARY OF THE INVENTION

Figure 1:
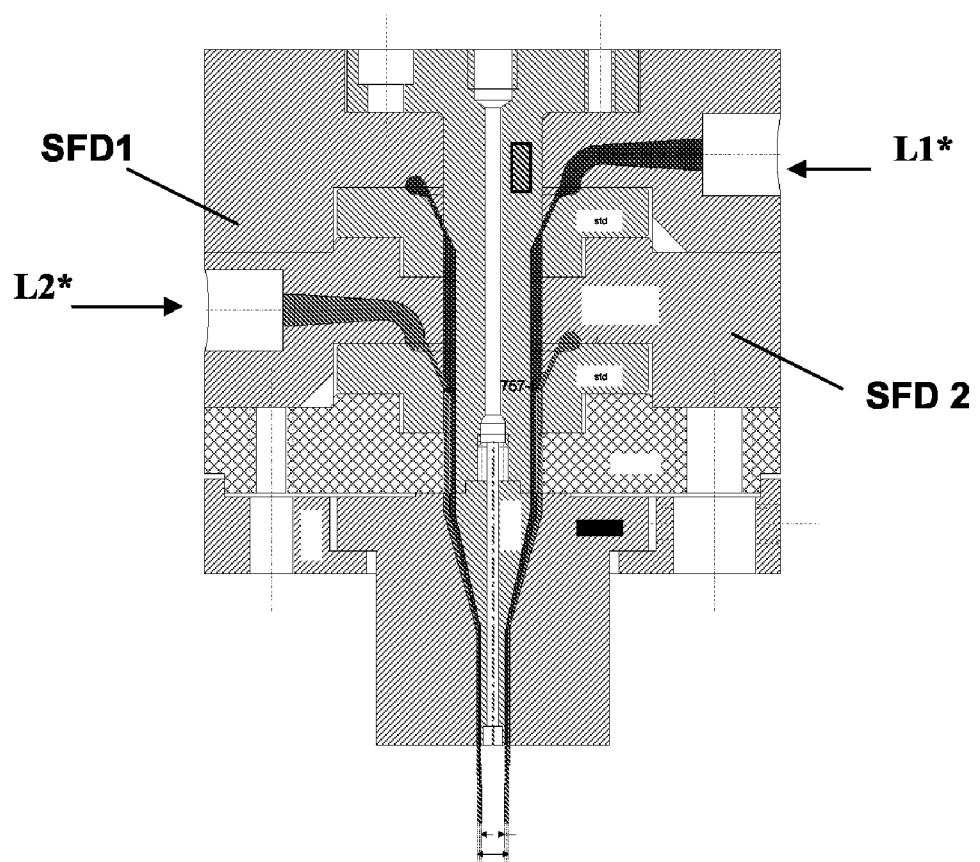
FIG. 1 shows the co-extrusion equipment used in Example 1.

With this end in view, the present invention concerns a multilayer structure comprising at least one couple (L1-L2) of adjacent layers (L1) and (L2), wherein layer (L1) comprises at least one polymer composition (C1) comprising a grafted fluoropolymer material (M1) consisting of $N_1$ grafted fluoropolymer(s) (P1), said polymer(s) (P1) being obtained by a process comprising grafting onto an ungrafted fluoropolymer (U1) at least one grafting agent (G1) chosen from ethylenically unsaturated carboxy acids, their esters, their anhydrides and their salts, layer (L2) comprises at least one polymer composition (C2) comprising at least one impact modifier (I2) and a semi-crystalline aromatic polyamide material (M2) consisting of $N_2$ semi-crystalline aromatic polyamide polymer(s) (P2), and the average melting temperature $(T_{av,1})$ of material (M1) differs by at most 45° C. from the average melting temperature $(T_{av,2})$ of material (M2), $N_j$ being the number of polymer(s) (Pj) of material (Mj), $Nj \geq 1$, $T_{av,j}$ being equal to $$\left(\sum_{i=1}^{N_j} w_{i,j} T_{i,j}\right) / W_j,$$

$w_{i,j}$ being the weight amount of the $i^{th}$ polymer (Pj) of material (Mj), $T_{i,j}$ being the melting temperature of the $i^{th}$ polymer (Pj) of material (Mj), $W_j$ being the total weight amount of material (Mj), for j=1 and for j=2.

In the invented multilayer structure, layer (L1) provides advantageously the multilayer structure notably with excellent chemical resistance and impermeability to fluid such as fuel, while layer (L2) provides advantageously the multilayer structure notably with strength and abrasion resistance.

In a certain embodiment of the present invention, the invented multilayer structure further comprises at least one layer (L3), adjacent to layer (L2), comprising at least one polymer composition (C3) comprising at least one impact modifier (I3) and a semi-crystalline aromatic polyamide material (M3) consisting of $N_3$ semi-crystalline aromatic polyamide polymer(s) (P3), where $N_3$ is the number of polymer(s) (P3) of material (M3).

In a certain other embodiment of the present invention, the invented multilayer structure further comprises at least one layer (L4), adjacent to layer (L1), comprising at least one polymer composition (C4) comprising an ungrafted fluoropolymer material (M4) consisting of $N_4$ ungrafted fluoropolymers (U4), where $N_4$ is the number of polymer(s) (P4) of material (M4).

The present invention is also directed to a process for manufacturing the above described multilayer structure which comprises co-extruding polymer compositions (C1) and (C2), so as to obtain couple (L1-L2) of adjacent layers (L1) and (L2).

The present invention is also directed to a shaped article comprising the above described multilayer structure and to a process for manufacturing said shaped article which comprises co-extruding polymer compositions (C1) and (C2), so as to obtain couple (L1-L2) of adjacent layers (L1) and (L2).

DETAILED DESCRIPTION OF THE INVENTION

The Multilayer Structure

The invented multilayer polymer structure comprises at least one couple (L1-L2) of adjacent layers (L1) and (L2). Examples of multilayer structures comprising at least one couple (L1-L2) of adjacent layers (L1) and (L2) include:
bilayer structures comprising (L1) and (L2) as sole layers, in which (L1) can be either the innermost or the outermost layer,
multilayer structures with more than two layers, comprising no more than one couple (L1-L2) and at least one additional layer, in particular trilayer structures in which the additional layer can be the innermost layer or the outermost layer.

It is sometimes preferred that the invented multilayer structure further comprises at least one layer (L3) as previously defined. Examples of multilayer structures comprising at least one triplet (L1-L2-L3) include:
trilayer structures comprising (L1), (L2) and (L3) as sole layers, in which (L1) can be either the innermost or the outermost layer,
multilayer structures with more than three layers, comprising no more than one triplet (L1-L2-L3) and at least one additional layer, in particular tetralayer structures in which the additional layer can be the innermost layer or the outermost layer.

It is also sometimes preferred that the invented multilayer structure further comprises at least one layer (L4) as previously defined. Examples of multilayer structures comprising at least one triplet (L4-L1-L2) include:
trilayer structures comprising, as sole layers, (L4), (L1) and (L2), in which (L4) can be either the innermost or the outermost layer,
multilayer structures with more than three layers, comprising no more than one triplet (L4-L1-L2) and at least one additional layer, in particular tetralayer structures in which the additional layer can be the innermost layer or the outermost layer.

It is also sometimes preferred that the invented multilayer structure further comprises at least one layer (L3) and at least one layer (L4) as previously defined. Examples of multilayer structures comprising at least one quartet (L4-L1-L2-L3) include:
tetralayer structures comprising, as sole layers, (L4), (L1), (L2) and (L3), in which (L4) can be either the innermost or the outermost layer,
multilayer structures with more than four layers, comprising no more than one quartet (L4-L1-L2-L3) and at least one additional layer, in particular pentalayer structures in which the additional layer can be the innermost layer or the outermost layer.

Layer (L1) is preferably more inner than layer (L2); this implies notably that:
when the multilayer structure comprises (L1) and (L2) as sole layers, it is preferred that (L1) be the innermost layer and (L2) be the outermost layer;
when the multilayer structure comprises no other layer than those of triplet (L1-L2-L3), it is preferred that (L1) be the innermost layer and (L2) be the intermediate layer;
when the multilayer structure comprises no other layer than those of triplet (L4-L1-L2), it is preferred that (L1) be the intermediate layer and (L2) be the outermost layer;
when the multilayer structure comprises no other layer than those of quartet (L4-L1-L2-L3), it is preferred that both (L1) and (L2) be intermediate layers, and L4 be the innermost layer.

The average melting temperature ($T_{av,1}$) of material (M1) differs preferably by at most 40° C. from the average melting temperature ($T_{av,2}$) of material (M2); more preferably, $T_{av,1}$ differs from $T_{av,2}$ by at most 35° C.; still more preferably, $T_{av,1}$ differs from $T_{av,2}$ by at most 30° C.

In addition, $T_{av,1}$ is advantageously less than or equal to $T_{av,2}$.

$N_j$ can be equal to 1, 2 or more. Preferably, $N_j$ is equal to 1. When $N_j$ is greater than 1, each out of the $N_j$ polymers (Pj) has a melting temperature $T_{i,j}$ differing preferably by at most 20° C., more preferably by at most 15° C., and still more preferably by at most 10° C. from $T_{av,j}$. The above applies for j=1 and for j=2.

Layer (L1).

The physical dimensions of layer (L1) are not particularly limited.

In certain preferred embodiments of the present invention, the thickness of layer (L1) is of at least 0.02 mm, preferably of at least 0.03 mm, more preferably of at least 0.05 mm. In addition, in said preferred embodiments, the thickness of layer (L1) is of below 0.2 mm.

In certain other preferred embodiments of the present invention, the thickness of layer (L1) is of at least 0.2 mm. In addition, in said other preferred embodiments, the thickness of layer (L1) is of at most 2.0 mm, preferably of at most 1.6 mm, and more preferably of below 1.0 mm.

In still other preferred embodiments of the present invention, the thickness of layer (L1) is of above 2.0 mm. In addition, in said still other preferred embodiments, the thickness of layer (L1) is preferably of at most 10.0 mm, more preferably of at most 8.0 mm, still more preferably of at most 6.0 mm.

According to the present invention, layer (L1) comprises at least one polymer composition (C1).

The weight amount of polymer composition (C1), based on the total weight of layer (L1), is advantageously of at least 10 wt. %, preferably of at least 40 wt. %, more preferably of at least 60 wt. %, still more preferably of at least 80 wt. %. Most preferably, layer (L1) consists essentially of polymer composition (C1).

According to the present invention, polymer composition (C1) comprises a grafted fluoropolymer material (M1) consisting of $N_1$ grafted fluoropolymer(s) (P1), said polymer(s) (P1) being obtained by a process comprising grafting at least one grafting agent (G1) onto an ungrafted fluoropolymer (U1).

For the purpose of the present invention, a fluoropolymer is intended to denote a polymer comprising recurring units derived from at least one ethylenically unsaturated monomer comprising at least one fluorine atom (hereafter, "fluorine-containing monomer") and, optionally in addition, at least one ethylenically unsaturated monomer free of fluorine atom.

Fluorine-containing monomer (u1) from which polymer (U1) is derived can be chosen from perhalogenated monomers (in particular, perfluorinated monomers), and partially halogenated monomers (typically, hydrohalogenated monomers).

Non limitative examples of perhalogenated monomers suitable as fluorine-containing monomer (u1) are tetrafluoroethylene (TFE), hexafluoropropene (HFP), hexafluoroisobutene (HFIB), perfluorobutylene (PFBE), chlorotrifluoroethylene (CTFE), perfluoro(methyl vinyl ether) (PMVE) and perfluoro(propyl vinyl ether) (PPVE).

Non limitative examples of partially halogenated monomers suitable as fluorine-containing monomer (u1) are trifluoroethylene (TrFE), vinylidene fluoride (VF2) and vinyl fluoride (VF).

Fluorine-containing monomer (u1) is advantageously chosen from the group consisting of fluoroolefins having 2-8 carbon atoms, and fluorinated vinyl ethers of the formula $CY_2=CYOR$ or $CY_2=CYOR'OR$ wherein Y is H or F, where R and R' are independently from each other completely or partially fluorinated, linear or branched respectively alkyl and alkylene groups containing 1-8 carbon atoms. Preferred R groups contain 1-4 carbon atoms; besides, they are preferably perfluorinated. Preferred R' groups contain 2-4 carbon atoms; besides, they are preferably perfluorinated. More preferably, fluorine-containing monomer (u1) is TFE or a mix of perfluorinated monomers consisting of more than 80 wt. %, based on the weight of the mix, of TFE and less than 20 wt. % of at least one perfluorinated monomer other than TFE.

Polymer (U1) can be a homopolymer such as a TFE homopolymer, or a copolymer.

Polymer (U1) is preferably a copolymer comprising recurring units derived from at least one other ethylenically unsaturated monomer free of fluorine atom, hereafter monomer (u'1). Monomer (u'1) is generally an alcene. (u'1) is preferably chosen from ethylene, propylene, n-butylene and isobutylene. More preferably, (u'1) is ethylene (Ee).

Non limitative examples of copolymers comprising recurring units derived from monomer (u'1) are Ee-CTFE copolymers, Ee-CTFE-HFP copolymers, Ee-CTFE-PPVE copolymers, and Ee-CTFE-HFP-PPVE-copolymers.

Polymer (U1) is more preferably a copolymer the recurring units of which are derived from ethylene on one hand, and tetrafluoroethylene or a mix of perfluorinated monomers consisting of tetrafluoroethylene and less than 20 wt. %, based on the weight of the mix, of at least one perfluorinated monomer other than tetrafluoroethylene on the other hand.

Non limitative examples of these copolymers are Ee-TFE copolymers, Ee-TFE-HFP copolymers, Ee-TFE-PPVE copolymers, and Ee-TFE-HFP-PPVE-copolymers.

According to the present invention, grafting agent (G1) is chosen from ethylenically unsaturated carboxy acids, their esters, their anhydrides and their salts.

Grafting agent (G1) is preferably chosen from substances with at most two carboxy groups. More preferably, grafting agent (G1) further comprises from 3 to 20 carbon atoms, like acrylic acid, methacrylic acid, maleic acid, fumaric acid, itaconic acid, crotonic acid, citraconic acid, maleic anhydride, succinic anhydride, itaconic anhydride, crotonic anhydride, citraconic anhydride and mixtures thereof. Still more preferably, grafting agent (G1) is chosen from maleic anhydride, succinic anhydride, acrylic acid, methacrylic acid, maleic acid, succinic acid and mixtures thereof. The most preferably, grafting agent (G1) is maleic anhydride.

When ethylenically unsaturated carboxy acids and/or their anhydrides are grafted onto polymer (U1), the resulting grafted carboxy acids and/or anhydride groups can be left unchanged; the case being, polymer (P1) is one with grafted carboxy acid and/or anhydride groups. They can also be subsequently reacted, in particular they can be partially or completely neutralized by one or more metallic neutralizing agents; the case being, polymer (P1) is one partially or completely neutralized grafted carboxy acid and/or anhydride groups.

The weight amount of grafting agent (G1), based on the weight of polymer (P1), is advantageously of at least 0.01 wt. %, preferably of at least 0.01 wt. % and more preferably of at least 0.05 wt. %. In addition, it is advantageously of at most 5.0 wt. %, preferably of at most 1.0 wt. % and more preferably of at most 0.5 wt. %.

The grafting of grafting agent (G1) may be accomplished by techniques known in the art.

The melting temperature of polymer (P1) $[T_{i,1}]$ is usually measured by Differential Scanning Calorimetry (DSC). Precisely, a Universal V3.7A Instruments DSC calorimeter was used by the Applicant to measure the melting temperature of polymer (P1). For this purpose, it was preliminarily checked that the calorimeter was well-calibrated by means of a calibration sample. Then, polymer (P1) was submitted to the following heating/cooling cycle: $1^{st}$ heating from room temperature up to 350° C. at a rate of 10° C./min, followed by cooling from 350° C. down to room temperature at a rate of 20° C./min, followed by $2^{nd}$ heating from room temperature up to 350° C. at a rate of 10° C./min. $T_{i,1}$ was measured during $2^{nd}$ heating. Melting is an endothermic first-order transition that appears as a negative peak on the DSC scan. $T_{i,1}$ is advantageously obtained by a construction procedure on the heat flow curve: the intersection of the two lines that are tangent to the peak at the points of inflection on either side of the peak define the peak temperature, namely $T_{i,1}$.

Material (M1) has an average melting temperature $T_{av,1}$ of advantageously at most 290° C., preferably at most 280° C., and more preferably at most 270° C.; in addition, $T_{av,1}$ is advantageously at least 240° C., preferably at least 250° C. and more preferably at least 260° C.

The melting temperature $(T_{i,1})$ of each polymer (P1) taken individually complies advantageously with the same conditions as those above defined for $T_{av,1}$ of material (M1), at any level of preference.

The weight amount of material (M1), based on the total weight of polymer composition (C1), is advantageously of at least 50 wt. %, preferably at least 80 wt. % and more preferably at least 90 wt. %.

Optionally, polymer composition (C1) may further comprise notably usual ingredients of fluoropolymer compositions.

Layer (L2)

The preferred physical dimensions of layer (L2) and weight amount of polymer composition (C2) in layer (L2) are the same as those of layer (L1) and composition (C1), at any level of preference.

According to the present invention, polymer composition (C2) comprises a semi-crystalline aromatic polyamide material (M2) consisting of $N_2$ semi-crystalline aromatic polyamide polymer(s) (P2).

For the purpose of the present invention, an aromatic polyamide is intended to denote a polymer of which more than 15 mol. % of the recurring units comprise at least one amide group (—CONH—) and at least one arylene group, such as phenylene, naphthalene and p-biphenylene. Said recurring units can be obtained notably by (i) the condensation reaction of an aromatic dicarboxy acid monomer with an aliphatic diamine monomer, (ii) the condensation reaction of an aliphatic dicarboxy acid monomer with an aromatic diamine monomer, (iii) the condensation reaction of an aromatic dicarboxy acid monomer with an aromatic diamine monomer, and (iv) the auto-condensation of an aromatic amino-acid.

Ortho-phthalic acid, isophthalic acid, terephthalic acid and 2,6-naphthalenedicarboxylic acid are examples of aromatic dicarboxy acid monomers, while meta-phenylene diamine, meta-xylylene diamine and para-xylylene diamine are examples of aromatic diamine monomers.

Adipic acid and sebacic acid are examples of aliphatic dicarboxy acid monomers, while hexamethylene diamine, methylpentamethylene diamine and nonanediamine are examples of suitable aliphatic diamine monomers.

An aromatic polyamide may further comprise recurring units consisting of at least one amide group and at least one alkylene group. Said recurring units can be obtained notably by the condensation reaction of an aliphatic dicarboxy acid monomer with an aliphatic diamine monomer, or by the auto-condensation of an aliphatic amino-acid.

Polymer (P2) comprises preferably more than 15 mol. %, based on the total number of moles of recurring units, of recurring units obtained by (i) the condensation reaction of an aromatic dicarboxy acid monomer with an aliphatic diamine monomer and/or (ii) the condensation reaction of an aliphatic dicarboxy acid monomer with an aromatic diamine monomer.

Besides, polymer (P2) comprises preferably less than 15 mol. %, based on the total number of moles of recurring units, of recurring units obtained by (iii) the condensation reaction of an aromatic dicarboxy acid monomer with an aromatic diamine monomer, and (iv) the auto-condensation of an aromatic amino-acid.

More preferably, polymer (P2) is a PMXDA, a polyphthalamide, or a mixture of a PMXDA and a polyphthalamide.

"PMXDA" is herein intended to denote an aromatic polyamide of which more than 50 mol. % of the recurring units, based on the total number of moles of recurring units, are obtained by the condensation reaction of an aliphatic dicarboxy acid monomer, preferably adipic acid, with an aromatic diamine monomer, preferably meta-xylylene diamine. PMXDAs are commercially available, notably, as IXEF® polyamides from Solvay Advanced Polymers, L.L.C.

The PMXDA comprises preferably more than 90 mol. % of recurring units obtained by the condensation reaction of an aliphatic dicarboxy acid monomer and an aromatic diamine.

Still more preferably, polymer (P2) is a polyphthalamide.

"Polyphthalamide" is herein intended to denote an aromatic polyamide other than a PMXDA, of which more than 35 mole % of the recurring units, based on the total number of moles of recurring units, are obtained by the condensation reaction of a phthalic acid monomer with an aliphatic diamine monomer, preferably hexamethylene diamine. "Phthalic acid monomer" is herein is intended to denote anyone of ortho-phthalic acid, isophthalic acid, terephthalic acid, and mixtures thereof. Polyphthalamides are commercially available, notably, as AMODEL® polyamides from Solvay Advanced Polymers, L.L.C.

The most preferably, polymer (P2) is a polyterephthalamide. "Polyterephthalamide" is herein intended to denote a polyphthalamide of which more than 35 mole % of the recurring units, based on the total number of moles of recurring units, are obtained by the condensation reaction of terephthalic acid with an aliphatic diamine, hereafter "terephthalamide units".

Polyterephthalamide (P2) comprises preferably more than 35 mol. %, and very preferably more than 45 mol. % of terephthalamide units. Besides, it comprises preferably less than 65 mol. % and very preferably less than 55 mol. % of terephthalamide units.

Preferably, polyterephthalamide (P2) further comprises recurring units obtained by the condensation reaction of an aliphatic diacid monomer, preferably adipic acid, with an aliphatic diamine monomer, preferably hexamethylene diamine, hereafter "aliphatic diacid-amide recurring units". It comprises more preferably more than 20 mol. %, still more preferably more than 30 mol. % and the most preferably more than 40 mol. % of aliphatic diacid-amide recurring units. Besides, it comprises preferably less than 80 mol. %, more preferably less than 60 mol. % and still more preferably less than 50 mol. % of aliphatic diacid-amide recurring units.

Also preferably, polyterephthalamide (P2) further comprises recurring units obtained by the condensation reaction of isophthalic acid with an aliphatic diamine monomer, preferably hexamethylene diamine, hereafter "isophthalamide recurring units". It comprises more preferably more than 1 mol. % and still more preferably more than 3 mol. % of isophthalamide recurring units. Besides, it comprises preferably less than 25 mol. %, more preferably less than 15 mol. % and still more preferably less than 10 mol. % of isophthalamide recurring units.

The melting temperature of polymer (P2) [$T_{i,2}$] is usually measured by Differential Scanning Calorimetry (DSC). Precisely, to measure $T_{i,2}$, the Applicant used the same method as the one above described for measuring $T_{i,1}$ of polymer (P1).

Material (M2) has an average melting temperature $T_{av,2}$ of advantageously at most 310° C., and more preferably at most 300° C.; in addition, $T_{av,2}$ is advantageously at least 265° C., preferably at least 280° C. and more preferably at least 290° C.

The melting temperature ($T_{i,2}$) of each polymer (P2) taken individually complies advantageously with the same conditions as those above defined for $T_{av,2}$ of material (M2), at any level of preference.

The weight amount of material (M2), based on the total weight of polymer composition (C2), is advantageously of at least 20 wt. %, preferably of at least 50 wt. %, and more preferably of at least 70 wt. %. In addition, it is advantageously of at most 90 wt. %, preferably of at most 85 wt. %, and more preferably of at most 80 wt. %.

According to the present invention, polymer composition (C2) further comprises at least one impact modifier (I2).

Impact modifier (I2) can be elastomeric or not. Suitable impact modifiers are not particularly limited, so long as they impart useful mechanical properties to polymer composition (C2), such as sufficient tensile elongation at yield and break. Advantageously, impact modifier (I2) further improves the processability of composition (C2), notably its aptitude to be co-extruded.

Impact modifier (I2) is preferably elastomeric.

Examples of elastomeric impact modifiers are ethylene (Ee)/1-octene (1Oe) copolymers, propylene (Pe)/1Oe copolymers, Ee/Pe/1Oe terpolymers, Ee/1-butene (1Be)/1Oe terpolymers, Pe/1Be/1Oe terpolymers, Ee/1Oe/1-pentene terpolymers, Ee/1Oe/styrene terpolymers, Ee/1Oe/acrylonitrile terpolymers, Ee/1Oe/methylacrylate terpolymers, Ee/1Oe/vinyl acetate terpolymers, Ee/1Oe/methyl methacrylate terpolymers, Pe/1Oe/styrene terpolymers, Pe/1Oe/acrylonitrile terpolymers, Pe/1Oe/methylacrylate terpolymers, Pe/1Oe/vinyl acetate terpolymers, Pe/1Oe/methyl methacrylate terpolymers, Ee/1Oe/1,4-hexadiene terpolymers, Pe/1Oe/1,4-hexadiene terpolymers, Ee/1Oe/ethylidenenorbornene terpolymers, Pe/1Oe/ethylidenenorbornene terpolymers, Ee/Pe copolymers (commonly known as "EPR rubbers"), chlorosulphonated Ee polymers ("PE rubber"), Ee/Pe/diene terpolymers ("EPDM rubbers") like for example Ee/Pe/1,4-hexadiene terpolymers and Ee/Pe/ethylidene norbornene terpolymers, butadiene rubbers (cis-1,4-polybutadiene), butyl rubbers like isobutylene-isoprene rubber, nitrile butadiene rubbers, styrene-butadiene rubbers, styrene-Ee-butadiene-styrene rubbers where butadiene may be hydrogenated or not, Ee-acrylic cross-linked rubbers (copolymers of ethylene with methyl methacrylate), natural rubber (cis-1,4-polyisoprene), chloroprene rubbers or neoprene (trans-1,4-polychloroprene), polyethers like epichlorohydrin elastomers and propylene oxide elastomers, polypentenamers such as polycyclopentene, thermoplastic urethane elastomers and mixtures thereof.

Impact modifier (I2) is more preferably an elastomer obtained by copolymerizing Ee with at least one higher alpha-olefin, and optionally in addition at least one diene.

Impact modifier (I2) is still more preferably chosen from elastomeric Ee/1Oe copolymers, EPR rubbers, EPDM rubbers, and mixtures thereof.

Good results were obtained when impact modifier (I2) was an EPDM rubber. Good results were also obtained when impact modifier (I2) was a mix of an elastomeric Ee/1Oe copolymer with an EPDM rubber.

Impact modifier (I2) may be grafted or not. All the above cited impact modifiers should herein be considered as specifically disclosed both in their grafted and in their ungrafted form.

When impact modifier (I2) consists of one compound, it is preferably grafted. When impact modifier (I2) consists of a plurality of compounds, preferably at least one of them is grafted.

Grafted impact modifiers are usually obtained by grafting at least one grafting agent (G2) onto an ungrafted impact modifier (U2).

As to its chemical nature and its weight amount, relative to the grafted compound, grafting agent (G2) has the same preferred characteristics as those grafting agent (G1), at any level of preference.

Commercially available grafted elastomeric polyolefins are, for example, maleated Ee-Pe copolymers such as EXXELOR® VA 1801 from the Exxon Mobil Chemical Company, EXXELOR® MDEX 94-11-2 from the Exxon Mobil Chemical Company, maleated Ee-Pe-diene terpolymers such as ROYALTUF® 498 available from the Crompton Corporation and maleated Ee-1Oe copolymers such as FUSABOND® 493D available from the Du Pont Company. Other commercially available grafted elastomers are acrylic or acrylate-modified polyethylene rubbers such as SURLYN® 9920 available from the DuPont Company and maleic anhydride-modified styrene-Ee-butylene-styrene block copolymer such as KRATON® FG1901X available from Kraton Polymers.

The amount of impact modifier (I2) is advantageously sufficient to impart notably desirable mechanical characteristics (e.g. tensile elongation at yield and break) and processability to polymer composition (C2).

Preferably, the weight amount of the impact modifier (I2), based on the total weight of polymer composition (C2), is of at most 50 wt. %, more preferably of at most 35 wt. %, and still more preferably of at most 30 wt. %. In addition, it is preferably of at least 1 wt. %, more preferably of at least 5 wt. %, still more preferably of at least 10 wt. %, and the most preferably of at least 20 wt. %.

Impact modifier (I2) may be incorporated in polymer composition (C2) in any possible manner. Mixing of impact modifier (I2) with the other components of polymer composition (C2) may occur preliminary to the manufacturing of the multilayer polymer structure in a separate extruder or it can occur immediately before the manufacturing of the multilayer polymer structure (for instance in the same extruder used to feed polymer composition (C2) to the co-extrusion die).

Optionally, polymer composition (C2) further comprises one or more additives like lubricants, pigments, antioxidants, heat stabilizers, fillers, dyes, flame retardants, plasticizers, mold release agents and light stabilizers, and polyamides other than polymer (P2). Said additives may be employed alone or in any combination. The levels of such additives can be determined for the particular use envisioned by one of ordinary skill in the art in view of this disclosure; very often, it does not exceed 10 wt. %; often, it is below 5 wt. %.

Preferably, polymer composition (C2) further comprises at least one lubricant, like a metallic stearate, a polytetrafluoroethylene (PTFE), a low density polyethylene, a metal sulfide such as $MoS_2$, graphite, boron nitride and mixtures thereof. More preferably, it comprises a PTFE; still more preferably, it comprises a non fibrillating PTFE, such as POLYMIST® F5A available from Solvay Solexis SpA. The weight amount of lubricant, based on the total weight of polymer composition (C2) ranges preferably from 0.10 wt. % to 1.0 wt. %.

Antioxidants possibly useful as ingredients of polymer composition (C2) are notably sterically hindered amines, sterically hindered phenols, phosphites, phosphonites, thiosynergists, and mixtures thereof. Antioxidants are often used in a weight amount ranging from 0.10 wt. % to 1.0 wt. %, based on the total weight of polymer composition (C2).

Colorants possibly useful as ingredients of polymer composition (C2) are notably pigments like carbon black and dyes like nigrosine. Pigments are often used in a weight amount ranging from 0.01 wt. % to 1.0 wt. %, based on the total weight of polymer composition (C2).

Heat stabilizers possibly useful as ingredients of polymer composition (C2) are notably copper-based stabilizers comprising a copper compound soluble in the polyamide and an alkali metal halide. Examples thereof are mixtures of copper iodide and/or copper bromide with an alkali bromide and/or iodide. Fillers possibly useful as ingredients of polymer composition (C2) are notably glass fibers, carbon fibers, graphite fibers, silicon carbide fibers, aramide fibers, wollastonite, talc, mica, titanium dioxide, potassium titanate, silica, kaolin, chalk, alumina, boron nitride, aluminum oxide. Fillers improve possibly notably mechanical strength (e.g. flexural modulus) and/or dimensional stability and/or friction and wear resistance.

Polyamides other than polymer (P2) possibly useful as ingredients of polymer composition (C2) are notably aliphatic polyamides. An aliphatic polyamide is herein intended to denote a polyamide of which more than 85 mole % of the recurring units are aliphatic. Examples of aliphatic polyamides include nylon 6,6, nylon 6,10, nylon 11, nylon 6, and nylon 12.

Optional Layer (L3)

As above mentioned, layer (L3) is adjacent to layer (L2) and comprises at least one polymer composition (C3).

The preferred physical dimensions of layer (L3) and weight amount of polymer composition (C3) in layer (L3) are the same as those of layer (L2) and composition (C2), at any level of preference.

As above mentioned, polymer composition (C3) comprises at least one impact modifier (I3) and a semi-crystalline aromatic polyamide material (M3) consisting of $N_3$ semi-crystalline aromatic polyamide polymer(s) (P3), where $N_3$ is the number of polymer(s) (P3) of material (M3), $N_3 \geq 1$. Preferably, $N_3=1$.

Unless specified otherwise hereafter, the preferred characteristics of polymer composition (C3) and its ingredients are the same as those of polymer composition (C2) and its ingredients, at any level of preference. In particular, likewise polymer (P2), polymer (P3) is most preferably a polyterephthalamide.

Polyterephthalamide (P3) comprises preferably more than 45 mol. %, and very preferably more than 55 mol. % of terephthalamide units. Besides, it comprises preferably less than 80 mol. % and very preferably less than 70 mol. % of terephthalamide units.

Preferably, polyterephthalamide (P3) further comprises aliphatic diacid-amide recurring units. It comprises more preferably more than 4 mol. % and still more preferably more than 8 mol. % of aliphatic diacid-amide recurring units. Besides, it comprises preferably less than 45 mol. %, more preferably less than 25 mol. % and still more preferably less than 15 mol. % of aliphatic diacid-amide recurring units.

Also preferably, polyterephthalamide (P3) further comprises isophthalamide recurring units. It comprises more preferably more than 10 mol. % and still more preferably more than 20 mol. % of isophthalamide recurring units. Besides, it comprises preferably less than 50 mol. %, more preferably less than 40 mol. % and still more preferably less than 30 mol. % of isophthalamide recurring units.

The average melting temperature ($T_{av,3}$) of material (M3) is equal to:

$$T_{av,3} = \left(\sum_{i=1}^{N_3} w_{i,3} T_{i,3}\right) / W_3,$$

$w_{i,3}$ being the weight amount of the $i^{th}$ polymer (P3) of material (M3), $T_{i,3}$ being the melting temperature of the $i^{th}$ polymer (P3) of material (M3), $W_3$ being the total weight amount of material (M3).

Material (M3) has an average melting temperature $T_{av,3}$ of advantageously at most 330° C., and more preferably at most 320° C.; in addition, $T_{av,3}$ is advantageously at least 285° C., preferably at least 295° C. and more preferably at least 305° C.

The melting temperature ($T_{i,3}$) of each polymer (P3) taken individually complies advantageously with the same conditions as those above defined for $T_{av,3}$ of material (M3), at any level of preference.

$T_{av,3}$ differs advantageously by at least 5° C., preferably by at least 10° C. and more preferably by at least 15° C. from $T_{av,2}$; in addition, $T_{av,3}$ differs advantageously by at most 40° C., preferably by at most 30° C. and more preferably by at most 25° C. from $T_{av,2}$. Besides, $T_{av,3}$ is preferably greater than $T_{av,2}$.

Optional Layer (L4)

As above mentioned, layer (L4) is adjacent to layer (L1) and comprises at least one polymer composition (C1).

The preferred physical dimensions of layer (L4) and weight amount of polymer composition (C4) in layer (L4) are the same as those of layer (L1) and composition (C1), at any level of preference.

As above mentioned, polymer composition (C4) comprises an ungrafted fluoropolymer material (M4) consisting of $N_4$ ungrafted fluoropolymer(s) (U4), where $N_4$ is the number of polymer(s) (P4) of material (M4), $N_4 \geq 1$. Preferably, $N_4=1$.

As to its nature, polymer (U4) has the same preferred characteristics as those of ungrafted fluoropolymer (U1), at any level of preference.

As to its amount, material (M4) has the same preferred characteristics as those of material (M1), at any level of preference.

Optionally, polymer composition (C1) may further comprise notably usual ingredients of fluoropolymer compositions.

The invented multilayer structure has high tensile properties, high impact and excellent tear strength. It has also outstanding barrier properties, including low water pick up and permeation rate for fuel and gases. It has excellent chemical resistance towards a wide variety of different chemical compounds such as esters, ketones, weak acids, aliphatic and aromatic hydrocarbons and alcohols. abrasion resistance. Finally, layers (L1) and (L4) offer excellent abrasion resistance. More generally, the invented multilayer structure exhibits an excellent overall balance of properties, in substantial progress when compared to prior art multilayer structures, in particular aliphatic polyamide-based and/or fluoropolymer-based structures.

The invented multilayer structure may be used in a variety of applications. Illustrative examples of such applications, but not restrictive thereof, are: hot water applications where low permeation and higher temperature is required, low cost vapor lines, heat exchanger tubing, high temperature fuel system applications, and particularly at higher temperatures than conventional polyamide applications, fuel tanks, insulating devices in electric motors and other electronic devices, in industrial transformers for insulators and compressor motor coil insulators, packaging and coating.

The present invention is also directed to a process for manufacturing the multilayer structure as above described, which comprises co-extruding polymer compositions (C1) and (C2), so as to obtain couple (L1-L2) of adjacent layers (L1) and (L2).

The present invention is also directed to a shaped article comprising the multilayer structure as above described. The invented shaped article is advantageously chosen from the group of flat films, tubular films, hollow bodies and sheets. It is preferably a hollow body, and more preferably it is chosen from pipes, hoses, fuel tanks, containers and bottles.

The present invention is also directed to a process for manufacturing the shaped article as above described, which comprises co-extruding polymer compositions (C1) and (C2), so as to obtain couple (L1-L2) of adjacent layers (L1) and (L2). Said co-extruding is advantageously achieved through slit-die co-extrusion, annular die co-extrusion or blow-molding co-extrusion.

EXAMPLES

Provided below are examples illustrative of the present invention, but not limitative thereof.

The following co-extrusion experiments consisted in manufacturing a tubular multilayer structure composed of two layers (L1*) [inner layer] and (L2*) [outer layer].

Example 1

Comparative (L1*) was composed of TEFZEL® grade from Du Pont, an Ee-TFE copolymer (ETFE). (L2*) was composed of a polyamide composition (C2a*) consisting of (i) 74.75 wt. %, based on the total weight of the composition, of a poyterephthalamide having a melting temperature of 295° C., comprising, as recurring units, about 50 mol. % of terephthalamide units, about 45 mol. % of adipamide units and about 5 mol. % of isophthalamide units, (ii) 25 wt. % of a maleic anhydride grafted EPDM wherein the diene was ENB, and (iii) 0.25 wt. % of a non fibrillating PTFE lubricant.

The co-extrusion equipment used for this example comprised:
- a modular cylindrical die comprising two stacked flow distributors (SFD1) and (SFD2), suited for manufacturing two layers tubings with an external diameter of 8 mm and an internal diameter of 6 mm (FIG. 1);
- two single screw extruders (E1) and (E2) having a diameter of 20 mm and a screw length of 720 mm.

Each of the stacked flow distributors was fed by one extruder. Extruder (E1) was used to extrude and feed to stacked flow distributor (SFD1) the TEFZEL® 200 grade, thereby forming inner layer (L1*), while extruder (E2) was used to extrude and feed to stacked flow distributor (SFD2) polyamide composition (C2a*), thereby forming outer layer (L2*).

Figure 2:
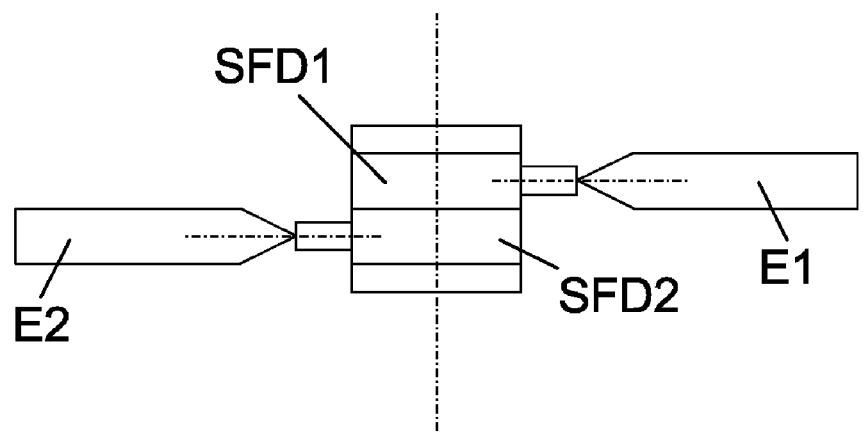
FIG. 2 shows the co-extrusion setup used in Example 1.
Figure 3:
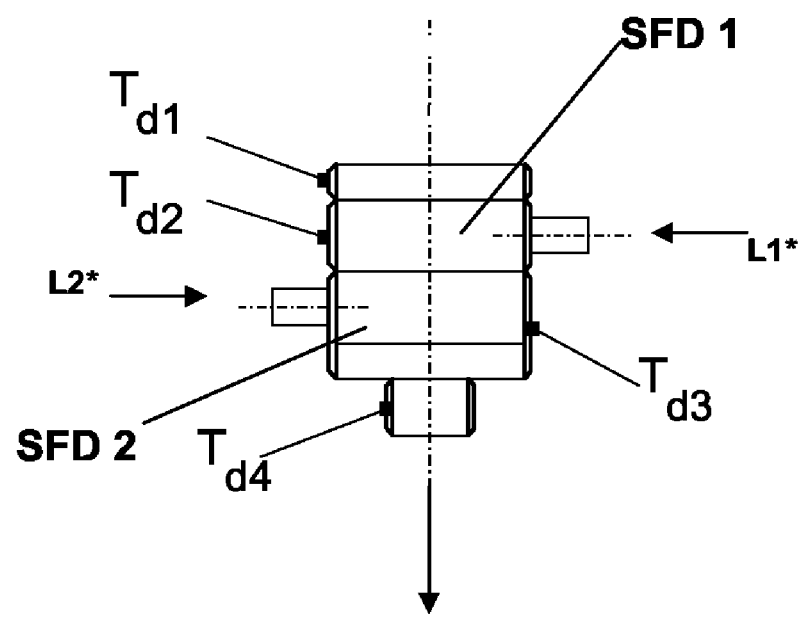
FIG. 3 shows four different temperature zones of a modular cylindrical die.

The co-extrusion setup used to run this test is shown in FIG. 2. Each extruder had three barrel temperature zones: Z1, Z2, Z3 respectively from inlet to outlet. The modular cylindrical die had four different temperature zones as shown in FIG. 3. Td1 was the temperature of the back-plate of the die. Td2 was the temperature of stacked flow distributor (SFD1). Td3 was the temperature of stacked flow distributor (SFD2). Td4 was the temperature of the die outlet section.

The co-extrusion process parameters are shown in Table 1.

During the test of co-extrusion of the tubular multilayer structure, the die temperatures were respectively Td1=Td2=310° C. for inner layer (L1*), and Td3=Td4=310° C. for outer layer (L2*).

The throughputs of extruders (E1) and (E2) were respectively 26.3 g/min and 22.1 g/min. At die exit, the layers could easily be peeled apart from one another (Table 1). Increasing the throughput in both extruders in order to generate a higher die pressure did not help improve the adhesion.

during the test of co-extrusion of the tubular multilayer structure, the die temperatures were respectively Td1=Td2=295° C. for layer (L1*), and Td3=Td4=295° C. for layer (L2*).

The other co-extrusion process parameters are shown in Table 1.

In this case, the adhesion between the layers was excellent (Table 1).

Example 3

Comparative

The procedure of Example 2 was repeated, except that:
- polyamide composition (C2a*) in layer (L2*) was replaced by polyamide composition (C2b*), wherein (C2b*) consists of (i) 73.1 wt. %, based on the total weight of the composition, of a poyterephthalamide having a melting temperature of 315° C., comprising, as recurring units, about 65 mol. % of terephthalamide units, about 10 mol. % of adipamide units and about 25 mol. % of isophthalamide units (the melting temperature of the poyterephthalamide differing by 49° C. from the melting temperature of the TEFZEL® HT-2202 grade), (ii) 25 wt. % of a maleic anhydride grafted EPDM wherein the diene was ENB, (iii) 1.0 wt. % of a non fibrillating PTFE lubricant, (iv) 0.5 wt. % of an antioxidant and (v) 0.4 wt. % of a pigment;
- the temperature profile in extruder (E2) and in the second part of the die had to be increased, so as to avoid polyamide composition (C2b*) from freezing; then, suitable die temperatures were 295-305° C. in the maleic anhydride grafted ETFE zone and 315° C. in the zone of (C2b*). Bubbles were observed in layer (L1*) (Table 1). Lowering the die temperature down to 305° C. in the (C2b*) zones in order to eliminate the bubbles caused layer (L2*) to partially freeze in the die and did not enable to eliminate the bubbles.

TABLE 1

Co-extrusion Process Parameters and Results

|  | Example 1 (Comparative) | Example 2 (According to the invention) | Example 3 (Comparative) |
| --- | --- | --- | --- |
| Composition of layer (L1*) (inner layer) | TEFZEL ® 200 ETFE | TEFZEL ® HT-2202 MA-g-ETFE | TEFZEL ® HT-2202 MA-g-ETFE |
| Extruder (E1) Z1/Z2/Z3 temperature (° C.) | 260/280/300 | 260/280/300 | 260/280/300 |
| Throughput of (E1) (g/min) | 26.3 | 20.6 | 20.6 |
| Composition of layer (L2*) (outer layer) | Polyamide composition (C2a*) | Polyamide composition (C2a*) | Polyamide composition (C2b*) |
| Extruder (E2) Z1/Z2/Z3 temperature (° C.) | 280/310/310 | 280/310/310 | 310/315/320 |
| Throughput of (E2) (g/min) | 22.1 | 33.9 | 30.4 |
| Die temperatures Td1/Td2/Td3/Td4 (° C.) | 310/310/310/310 | 295/295/295/295 | 295/295/315/315 |
| Adhesion between layers | none | excellent | good |
| Bubbles in layer (L1*) | none | none | yes |

Example 2

According to the Invention

The procedure of Example 1 was repeated, except that:
inner layer (L1*) was composed of TEFZEL® HT-2202 grade from Du Pont, a maleic anhydride grafted Ee-TFE copolymer having a melting temperature of 266° C., instead of TEFZEL® ETFE grade, and

The invention claimed is:

1. A multilayer structure comprising at least one couple (L1-L2) of adjacent layers (L1) and (L2), wherein layer (L1) comprises at least one polymer composition (C1) comprising a grafted fluoropolymer material (M1) consisting of $N_1$ grafted fluoropolymer(s) (P1), said polymer(s) (P1) being obtained by a process comprising grafting onto an ungrafted fluoropolymer (U1) at least one grafting agent (G1) chosen from ethylenically unsaturated carboxy acids, their esters, their anhydrides and their salts, layer (L2) comprises at least one polymer composition (C2) comprising at least one impact modifier (I2) and a semi-crystalline aromatic polyamide material (M2) consisting of $N_2$ semi-crystalline aromatic polyamide polymer(s) (P2), and the average melting temperature ($T_{av,1}$) of material (M1) differs by at most 35° C. from the average melting temperature ($T_{av,2}$) of material (M2), $N_j$ being the number of polymer(s) (Pj) of material (Mj), $Nj \geq 1$, $T_{av,j}$ being equal to $$\left( \sum_{i=1}^{N_j} w_{i,j} T_{i,j} \right) / W_j,$$

$w_{i,j}$ being the weight amount of the $i^{th}$ polymer (Pj) of material (Mj), $T_{i,j}$ being the melting temperature of the $i^{th}$ polymer (Pj) of material (Mj), $W_j$ being the total weight amount of material (Mj), for j=1 and for j=2, wherein polymer (P2) is a PMXDA.

2. The multilayer structure according to claim 1, wherein the average melting temperature ($T_{av,1}$) of material (M1) differs by at most 30° C. from the average melting temperature ($T_{av,2}$) of material (M2).

3. The multilayer structure according to claim 1, wherein $T_{av,1}$ is less than or equal to $T_{av,2}$.

4. The multilayer structure according to claim 1, wherein layer (L1) is more inner than layer (L2).

5. The multilayer structure according to claim 1, wherein layer (L1) consists essentially of polymer composition (C1) and layer (L2) consists essentially of polymer composition (C2).

6. The multilayer structure according to claim 5, wherein the weight amount of material (M1), based on the total weight of polymer composition (C1), is of at least 50 wt. %, and the weight amount of material (M2), based on the total weight of polymer composition (C2), is of at least 50 wt. %.

7. The multilayer structure according to claim 1, wherein polymer (U1) is a copolymer the recurring units of which are derived from ethylene on one hand, and tetrafluoroethylene or a mix of perfluorinated monomers consisting of tetrafluoroethylene and less than 20 wt. %, based on the weight of the mix, of at least one perfluorinated monomer other than tetrafluoroethylene on the other hand.

8. The multilayer structure according to claim 1, wherein grafting agent (G1) is maleic anhydride.

9. The multilayer structure according to claim 1, wherein material (M1) has an average melting temperature $T_{av,1}$ of at least 250° C.

10. The multilayer structure according to claim 1, wherein material (M2) has an average melting temperature $T_{av,2}$ of from 280° C. to 300° C.

11. The multilayer structure according to claim 1, wherein impact modifier (I2) is elastomeric.

12. The multilayer structure according to claim 1, wherein impact modifier (I2) is chosen from optionally grafted elastomeric ethylene/1-octene copolymers, optionally grafted EPR rubbers, optionally grafted EPDM rubbers, and mixtures thereof.

13. The multilayer structure according to claim 1, wherein the weight amount of the impact modifier (I2), based on the total weight of polymer composition (C2), is of at least 10 wt. %.

14. The multilayer structure according to claim 1, which is a bilayer structure comprising (L1) and (L2) as sole layers.

15. The multilayer structure according to claim 1, which further comprises at least one layer (L3), adjacent to layer (L2), comprising at least one polymer composition (C3) comprising at least one impact modifier (I3) and a semi-crystalline aromatic polyamide material (M3) consisting of $N_3$ semi-crystalline aromatic polyamide polymer(s) (P3), where $N_3$ is the number of polymer(s) (P3) of material (M3) and $N_3 \geq 1$.

16. The multilayer structure according to claim 15, which is a trilayer structure comprising (L1), (L2) and (L3) as sole layers, in which (L1) can be either the innermost or the outermost layer.

17. The multilayer structure according to claim 15, wherein polymer (P3) is a polyterephthalamide.

18. The multilayer structure according to claim 17, wherein polymer (P3) comprises more than 55 mol. % of terephthalamide units and further comprises aliphatic diacidamide recurring units, in an amount of less than 25 mol. %.

19. The multilayer structure according to claim 15, which further comprises at least one layer (L4), adjacent to layer (L1), comprising at least one polymer composition (C4) comprising an ungrafted fluoropolymer material (M4) consisting of $N_4$ ungrafted fluoropolymers (U4), where $N_4$ is the number of polymer(s) (P4) of material (M4) and $N_4 > 1$.

20. The multilayer structure according to claim 19, which is a tetralayer structure comprising (L4), (L1), (L2) and (L3) as sole layers, in which (L4) can be either the innermost or the outermost layer.

21. The multilayer structure according to claim 1, which further comprises at least one layer (L4), adjacent to layer (L1), comprising at least one polymer composition (C4) comprising an ungrafted fluoropolymer material (M4) consisting of $N_4$ ungrafted fluoropolymers (U4), where $N_4$ is the number of polymer(s) (P4) of material (M4) and $N_4 > 1$.

22. The multilayer structure according to claim 21, wherein polymer (U4) is a copolymer the recurring units of which are derived from ethylene on one hand, and tetrafluoroethylene or a mix of perfluorinated monomers consisting of tetrafluoroethylene and less than 20 wt. %, based on the weight of the mix, of at least one perfluorinated monomer other than tetrafluoroethylene on the other hand.

23. A process for manufacturing the multilayer structure according to claim 1, which comprises co-extruding polymer compositions (C1) and (C2), so as to obtain couple (L1-L2) of adjacent layers (L1) and (L2).

24. A shaped article comprising the multilayer structure according to claim 1, said shaped article being a hollow body selected from the group consisting of pipes, hoses, fuel tanks, containers and bottles.

25. A process for manufacturing the shaped article according to claim 24, which comprises co-extruding polymer compositions (C1) and (C2), so as to obtain couple (L1-L2) of adjacent layers (L1) and (L2).

26. The multilayer structure according to claim 1, wherein the average melting temperature ($T_{av,1}$) of material (M1) differs by at most 30° C. from the average melting temperature ($T_{av,2}$) of material (M2).

27. A multilayer structure comprising at least one couple (L1-L2) of adjacent layers (L1) and (L2), wherein layer (L1) comprises at least one polymer composition (C1) comprising a grafted fluoropolymer material (M1) consisting of $N_1$ grafted fluoropolymer(s) (P1), said polymer(s) (P1) being obtained by a process comprising grafting onto an ungrafted fluoropolymer (U1) at least one grafting agent (G1) chosen from ethylenically unsaturated carboxy acids, their esters, their anhydrides and their salts, layer (L2) comprises at least one polymer composition (C2) comprising at least one impact modifier (I2) and a semi-crystalline aromatic polyamide material (M2) consisting of $N_2$ semi-crystalline aromatic polyamide polymer(s) (P2), and the average melting temperature ($T_{av,1}$) of material (M1) differs by at most 45° C. from the average melting temperature ($T_{av,2}$) of material (M2), $N_j$ being the number of polymer(s) (Pj) of material (Mj), $Nj \geq 1$, $T_{av,j}$ being equal to $$\left( \sum_{i=1}^{N_j} w_{i,j} T_{i,j} \right) / W_j,$$

$w_{i,j}$ being the weight amount of the polymer (Pj) of material (Mj), $T_{i,j}$ being the melting temperature of the polymer (Pj) of material (Mj), $W_j$ being the total weight amount of material (Mj), for j=1 and for j=2, which further comprises at least one layer (L3), adjacent to layer (L2), comprising at least one polymer composition (C3) comprising at least one impact modifier (I3) and a semi-crystalline aromatic polyamide material (M3) consisting of $N_3$ semi-crystalline aromatic polyamide polymer(s) (P3), where $N_3$ is the number of polymer(s) (P3) of material (M3) and $N_3 \geq 1$ wherein $T_{av,3}$ differs by at least 10° C. from $T_{av,2}$.

28. A multilayer structure comprising at least one couple (L1-L2) of adjacent layers (L1) and (L2), wherein layer (L1) comprises at least one polymer composition (C1) comprising a grafted fluoropolymer material (M1) consisting of $N_1$ grafted fluoropolymer(s) (P1), said polymer(s) (P1) being obtained by a process comprising grafting onto an ungrafted fluoropolymer (U1) at least one grafting agent (G1) chosen from ethylenically unsaturated carboxy acids, their esters, their anhydrides and their salts, layer (L2) comprises at least one polymer composition (C2) comprising at least one impact modifier (I2) and a semi-crystalline aromatic polyamide material (M2) consisting of $N_2$ semi-crystalline aromatic polyamide polymer(s) (P2), and the average melting temperature ($T_{av,1}$) of material (M1) differs by at most 45° C. from the average melting temperature ($T_{av,2}$) of material (M2), $N_j$ being the number of polymer(s) (Pj) of material (Mj), $Nj \geq 1$, $T_{av,j}$ being equal to $$\left( \sum_{i=1}^{N_j} w_{i,j} T_{i,j} \right) / W_j,$$

$w_{i,j}$ being the weight amount of the $i^{th}$ polymer (Pj) of material (Mj), $T_{i,j}$ being the melting temperature of the polymer (Pj) of material (Mj), $W_j$ being the total weight amount of material (Mj), for j=1 and for j=2, which further comprises at least one layer (L3), adjacent to layer (L2), comprising at least one polymer composition (C3) comprising at least one impact modifier (I3) and a semi-crystalline aromatic polyamide material (M3) consisting of $N_3$ semi-crystalline aromatic polyamide polymer(s) (P3), where $N_3$ is the number of polymer(s) (P3) of material (M3) and $N_3 \geq 1$ wherein $T_{av,3}$ is greater than $T_{av,2}$.

* * * * *

UNITED STATES PATENT AND TRADEMARK OFFICE
CERTIFICATE OF CORRECTION

PATENT NO. : 7,960,014 B2
APPLICATION NO. : 11/720128
DATED : June 14, 2011
INVENTOR(S) : Corinne Bushelman et al.

It is certified that error appears in the above-identified patent and that said Letters Patent is hereby corrected as shown below:

Title page, Item (75), "Johan Billiet, Ghent (BE)" should read --Johan Billiet, Gent (BE)--;

Title page, Item (86), "May 24, 2007" should read --February 7, 2008--;

Title page, Item (57), line 17, "material (Mj), Nj>1," should read --material (Mj), Nj≥1,--;

Title page, Item (57), line 24, "adjacent layers (T1) and (T2).", should read --adjacent layers (L1) and (L2).--;

Column 15, line 13, "Nj≧1," should read --Nj≥1,--;

Column 16, line 13, "the number of polymer(s) (P3) of material (M3) and $N_3 \geqq 1$." should read --the number of polymer(s) (P3) of material (M3) and $N_3 \geq 1$--;

Column 16, line 29, "of polymer(s) (P4) of material (M4) and $N_4$>1." should read --of polymer(s) (P4) of material (M4) and $N_4 \geq 1$.--;

Column 16, line 39, "of polymer(s) (P4) of material (M4) and $N_4$>1." should read --of polymer(s) (P4) of material (M4) and $N_4 \geq 1$.--;

Column 17, line 15, "Nj≧1," should read --Nj≥1,--;

Column 17, line 24, "$w_{ij}$ being the weight amount of the polymer" should read --$w_{ij}$ being the weight amount of the $i^{th}$ polymer--;

Column 17, line 26, "$T_{ij}$ being the melting temperature of the polymer" should read --$T_{ij}$ being the melting temperature of the $i^{th}$ polymer--;

Signed and Sealed this
Twentieth Day of September, 2011

David J. Kappos
*Director of the United States Patent and Trademark Office*

CERTIFICATE OF CORRECTION (continued)
U.S. Pat. No. 7,960,014 B2

Column 17, line 37, "of material (M3) and $N_3 \geqq 1$" should read --of material (M3) and $N_3 \geq 1$--;

Column 18, line 18, "$Nj \geqq 1$," should read --$Nj \geq 1$,--;

Column 18, line 27, "$T_{ij}$ being the melting temperature of the polymer" should read --$T_{ij}$ being the melting temperature of the i$^{th}$ polymer--;

Column 18, line 37, "of material (M3) and $N_3 \geqq 1$" should read --of material (M3) and $N_3 \geq 1$--.